United States Patent [19]
Buckley et al.

[11] Patent Number: 6,024,344
[45] Date of Patent: Feb. 15, 2000

[54] METHOD FOR RECORDING SEISMIC DATA IN DEEP WATER

[75] Inventors: W. Scott Buckley; Andrew Patrick Lamb, both of Houston, Tex.

[73] Assignee: Western Atlas International, Inc., Houston, Tex.

[21] Appl. No.: 09/251,845

[22] Filed: Feb. 17, 1999

[51] Int. Cl.[7] .................................................. G01V 1/28
[52] U.S. Cl. .............................. 267/76; 367/21; 181/110
[58] Field of Search ................................ 367/15, 21, 76; 181/110, 112

[56] References Cited

U.S. PATENT DOCUMENTS

| | | | |
|---|---|---|---|
| 5,189,642 | 2/1993 | Donoho et al. | 367/15 |
| 5,623,455 | 4/1997 | Norris | 367/76 |
| 5,724,241 | 3/1998 | Wood et al. | 364/421 |

*Primary Examiner*—Christine K. Oda
*Assistant Examiner*—Anthony Jolly
*Attorney, Agent, or Firm*—Alan J. Atkinson

[57] ABSTRACT

A method for recording seismic data in deep water. A plurality of seismic data recorders are attached to a wire stored on a seismic vessel. A free end of the wire is deployed into the water, and the recorders are attached at selected positions along the wire. The wire and recorders are lowered into the water as the vessel moves to control the recorder deployment. The wire controls recorder location and establishes the recorder spacing interval. After the recorders are operated to record seismic data, the wire and attached recorders can be retrieved to the water surface. The recorders can be detached from the wire to facilitate storage and data retrieval from each recorder.

18 Claims, 2 Drawing Sheets

METHOD FOR RECORDING SEISMIC DATA IN DEEP WATER

BACKGROUND OF THE INVENTION

The present invention relates to the field of marine seismic exploration. More particularly, the invention relates to the collection of marine seismic data in deep water environments.

Marine seismic exploration requires acoustic source generators for delivering energy to subsurface geologic formations and boundaries. The acoustic energy is discharged along shot lines in the desired survey region and is reflected by the subsurface formations and boundaries. The reflected energy propagates upwardly and is detected with hydrophones or bottom cable geophones. Data from adjacent shot lines are processed to construct an overall geologic image of the subsurface geologic formations.

In shallow water up to one hundred meters deep, bottom cable systems use geophones and hydrophones laid on the sea floor with seismic cable cables. Cable crews connect each cable section as the bottom cables are deployed, retrieved and repaired. One or more vessels deploy the geophones and cable in the selected locations and retrieve the geophones and cables after the selected area is surveyed. In deep water exceeding one hundred meters water depth, conventional bottom cable systems are not useful because such systems require expensive, complex connectors which fail due to leakage and cross-feeding of electrical connections. Failure of a single connector requires repair of the entire cable, significantly increasing survey downtime and the resulting survey cost.

In addition to technical difficulties inherent in bottom cable systems, the size, weight and handling requirements of bottom cable systems are difficult to implement in deep water environments. To overcome these limitations, marine seismic vessels are conventionally used in deep water to perform seismic surveys. Marine seismic vessels tow acoustic energy sources such as compressed air guns through the water. The vessels also tow one or more seismic streamer cables along the selected survey line. The streamers typically range between three and eight kilometers long, and tail buoys attached to the free streamer ends incorporate radar reflectors and navigation and acoustic transponders. Each streamer contains multiple hydrophones which receive the reflected energy emitted by the energy source. The hydrophones are typically wired together in receiver groups regularly spaced along the streamer. To account for vessel movement, data recording and processing calculations require time and position correlations for each active component of the seismic data gathering system.

Variations in the lateral spacing between adjacent streamers due to environmental forces and vessel course changes introduce variables in the collected data. The actual spacing between receiver groups is critical for an accurate analysis of geophysical data. Because the acoustic energy reflections propagate through the water in a towed streamer system, noise significantly distorts the reflected energy. The problems associated with undesirable noise is well known. For example, U.S. Pat. No. 4,970,696 to Crews et al. (1990) disclosed a three dimensional seismic survey system having multiple seismic receivers. Undesirable noise was characterized with uniform sampling intervals and the recorded responses were processed to remove the undesirable noise. In other systems, additional processing is required to account for additional noise, and the quality of maps created from the processed data is reduced.

Other systems have been developed to collect data in a marine environment, and to return the data to the water surface. U.S. Pat. No. 4,007,436 to McMahon (1977) disclosed a flexible sheet for holding hydrophones. U.S. Pat. No. 4,692,906 to Neeley disclosed an ocean bottom seismometer having a weighted skirt which also provided a buoyant space for retrieving the seisometer to the water surface. U.S. Pat. No. 5,189,642 to Donoho et al. (1993) disclosed a seafloor seismic recorder having a chassis which lowered geophones into contact with the seafloor. A geophone package was embedded into the seafloor, and a control package and chassis was raised above the seafloor surface with a leg extension to isolate such components from the geophone package. A ballast ring returned the geophone package to the water surface. Additionally, U.S. Pat. No. 5,696,738 to Lazauski (1997) disclosed a sensing device in contact with the seafloor.

Other systems have been developed to operate and to collect seismic data from multiple recorders. U.S. Pat. No. 4,281,403 to Siems (1981) disclosed a plurality of remote seismic recording units activated with local clocks in each local recording unit, together with a master clock in a central station. U.S. Pat. No. 5,623,455 to Norris (1997) disclosed remote units connected to a plurality of receivers for collecting and transmitting seismic data over a selected transmission channel. U.S. Pat. No. 5,724,241 to Wood et al. (1998) disclosed a distributed data acquisition system having a plurality of recorders for detecting and recording seismic data. The data was collected and continuously collected by data acquisition modules.

In addition to the systems described above, bottom cables are used in relatively shallow water depths to communicate between underwater recorders and equipment located on board a marine seismic vessel. However, bottom cables are heavy because such cables contain insulated lines for transmitting power and signals between the marine recorders and the seismic vessel. The weight, size and reliability concerns of bottom cables, together with the operational expense of deploying and retrieving bottom cables, effectively prevents conventional bottom cable systems from being deployed in deep water.

Existing marine seismic systems do not efficiently position multiple recorders in a deep water array. Accordingly, a need exists for an improved deep water seismic data collection method. The method should preserve the quality of data collection so that subsequent geophysical data processing is enhanced.

SUMMARY OF THE INVENTION

The present invention provides a method for collecting seismic data in a marine environment. The method comprises the steps of deploying a wire free end into water, of engaging a plurality of recorders with said wire at selected locations along said wire, of lowering said wire and engaged recorders into the water until said recorders are positioned at selected positions relative to the seafloor underlying the water, of operating said recorders to detect seismic source energy reflections and to record seismic data representing such reflections, and of raising said wire to retrieve said recorders to the water surface.

In other embodiments of the invention, the recorders can be attached to the wire, or can be moveable in a selected range along the wire. The recorders can be attached to connectors on the wire, the location and orientation of the recorders can be determined before the seismic data is recorded, and a second wire and attached recorders can be deployed in a selected location relative to the first wire and recorders. As the wire and recorders are retrieved to the water surface, the seismic data can be extracted from the recorders so that the recorders can be prepared for another deployment.

DESCRIPTION OF THE PREFERRED EMBODIMENTS

Figure 1:
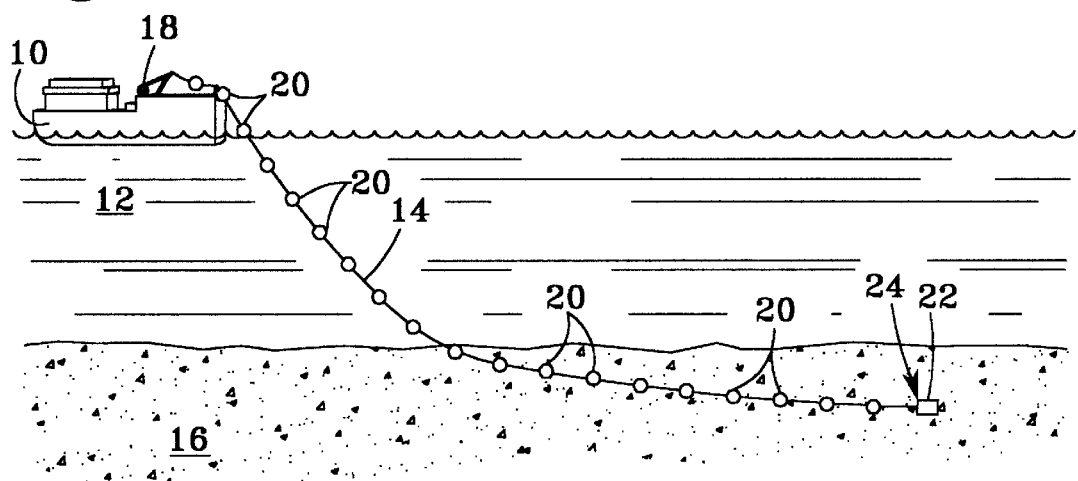
FIG. 1 illustrates a vessel deploying a wire and recorders.

The invention provides a method for positioning data recorders in deep water, and of retrieving such recorders for further processing of seismic data. Referring to FIG. 1, tender barge or vessel 10 moves through water 12 to deploy and to retrieve wire 14 proximate to seafloor 16. A spool or cable engine 18 is supported by vessel 10 for storing and handling wire 14. Cable engine 18 comprises any mechanism or structure capable of maintaining tension in wire 14 or of facilitating movement of wire 14 from one location to another. The term "wire" as used herein means a pliable metallic, nonmetallic, or composite material strand or single rod which can be bare or insulated. The exterior surface of wire 14 can comprise armor or cladding integrated into wire 14 or wrapped as a separate component around an exterior surface of wire 14. Wire 14 provides the functions of providing support for remote recorders 20, of deploying and retrieving recorders 20 to and from seafloor 16, and of defining the interval between adjacent recorders 20. Additionally, wire 14 can provide the function of providing electrical communication for power or signals between adjacent recorders 20, and between recorders 20 and vessel 10.

Recorders 20 are attached to wire 14 at selected intervals to detect reflected energy. Recorders 20 can comprise different devices suitable for detecting and recording seismic source energy reflections. As a representative example, recorders 20 can comprise geophones and hydrophones such as an ocean bottom seismometer unit having a data recorder, battery pack, data storage mechanism, acoustic transponder, timer, acoustic modem, compass, gimbal lock, and other conventional equipment. Each recorder 20 preferably includes an exterior pressure housing suitable for withstanding high water pressures located deep in the ocean. Sensors and equipment can be located inside of or outside of such pressure housing. By limiting pressure seal requirements to recorders 20, sealing systems in wire 14 do not exist to provide potential failure sources.

The invention provides a unique method for positioning and retrieving a plurality of recorders 20 in a seismic data collection array. Although wire 14 is especially adapted to placement of recorders 20 in a substantially straight line, wire 14 is sufficiently flexible to permit placement of recorders 20 in nonlinear or alternative array configurations. As used herein, the term "plurality" means two or more. Each recorder 20 is engaged with or is attached to wire 14 at a selected position. The distances between adjacent recorders 20 can be equal or can vary to provide desired recorder 20 separations. Anchor 22 can be attached to free end 24 of wire 14 to facilitate initial placement of wire 14 within water 12 at a selected location relative to seafloor 16. Anchors 22 can be placed at other locations to account for high current or unstable seafloor 16 conditions.

Figure 2:
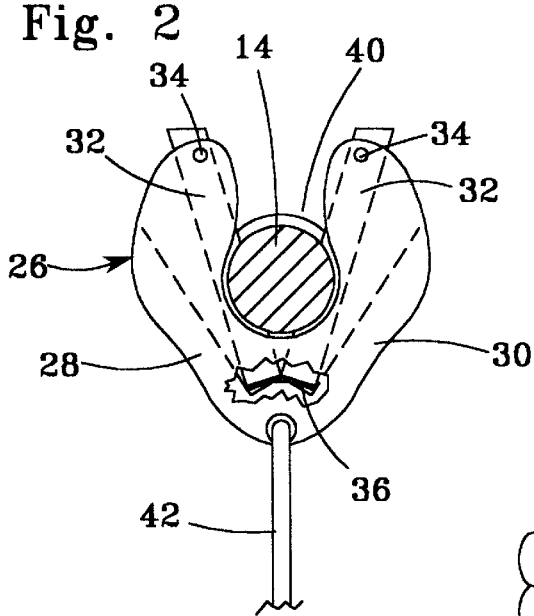
FIGS. 2 and 3 illustrate a connector for engaging a recorder with a wire.
Figure 3:
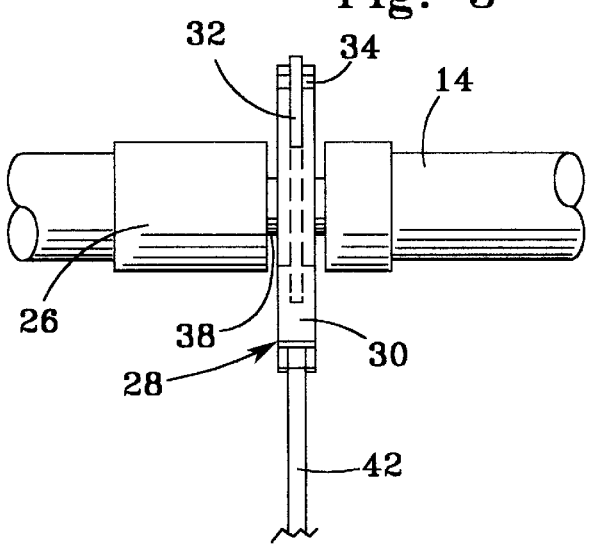

In one embodiment of the invention, each recorder 20 can be attached to wire 14 with a connector 26 suitable for retaining recorder 20 is a desired position relative to wire 14. The desired positions or intervals can be marked with paint, tags, wire discontinuities, or other devices to facilitate crew or automated handling on vessel 10. Connector 26 can fix the location of a recorder 20, or can permit recorder 20 to move along a selected length of wire 14. Movement relative to wire 14 may be desirable to reduce stresses acting on connector 26, to facilitate hookup and removal, or for other reasons. In one embodiment of the invention, connector 26 can grasp wire 14 with a locking grip. In other embodiments of the invention, connector 26 can engage a loop, pin, wire discontinuity, or collar attached to wire 14. Referring to FIGS. 2 and 3, a representative example of a connector such as wire clasp 28 includes frame 30 and locking arms 32. Arms 32 rotate about pins 34 and are biased with tension spring 36 to pull inwardly toward the other. Connector 26 is attached to wire 14 and has groove 38 for engagement with opening 40 through clasp 28. Connector 26 can comprise a quick disconnect device for expediting deployment and retrieval. Tag line 42 can be attached to clasp 28 at one end and to recorder 20 at another end to provide an offset therebetween, and to facilitate handling of recorder 20.

Although clasp 28 is suitable for engaging recorder 20 with a selected portion of wire 14, many other types of connectors and attachment techniques are suitable for accomplishing the function provided. Preferably, the attachment mechanism or technique does not interfere with deployment and retrieval of wire 14 on cable engine 18.

To deploy recorders 20 within water 12, recorders 20 are transported with vessel 10 or other means to the seismic survey region. Recorders 20 can be stored in a sequential manner to facilitate deployment. Anchor 22 is attached to free end 24, and is deployed into water 12 at the desired position within the seismic survey area. Wire 14 is paid out from cable 18, and recorders 20 are engaged with wire 14 at the selected intervals. Wire 14 can be handled in a serpentine manner on board vessel 10 so that multiple recorders 20 can be attached simultaneously by different crew or automated machines.

Figure 4:
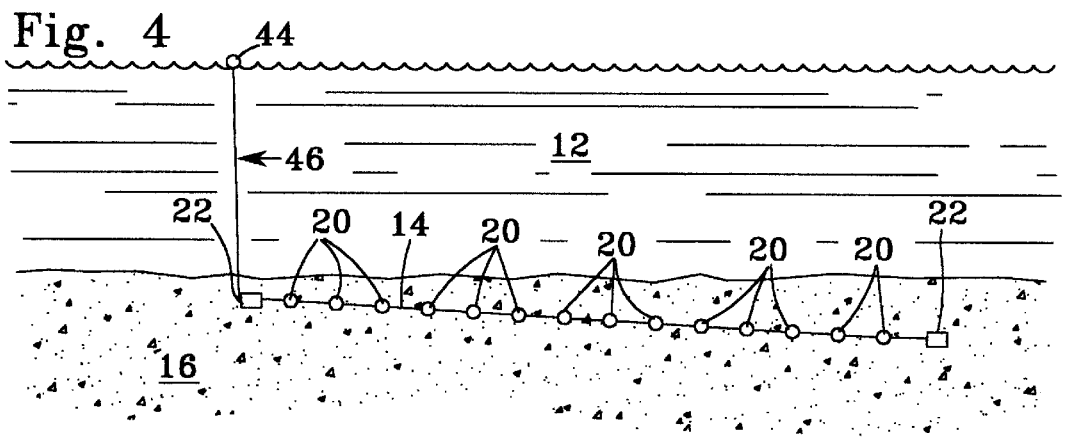
FIG. 4 illustrates a wire and engaged recorders located on the seafloor, and further illustrates one technique for raising a wire to the water surface with a releasable float.
Figure 5:
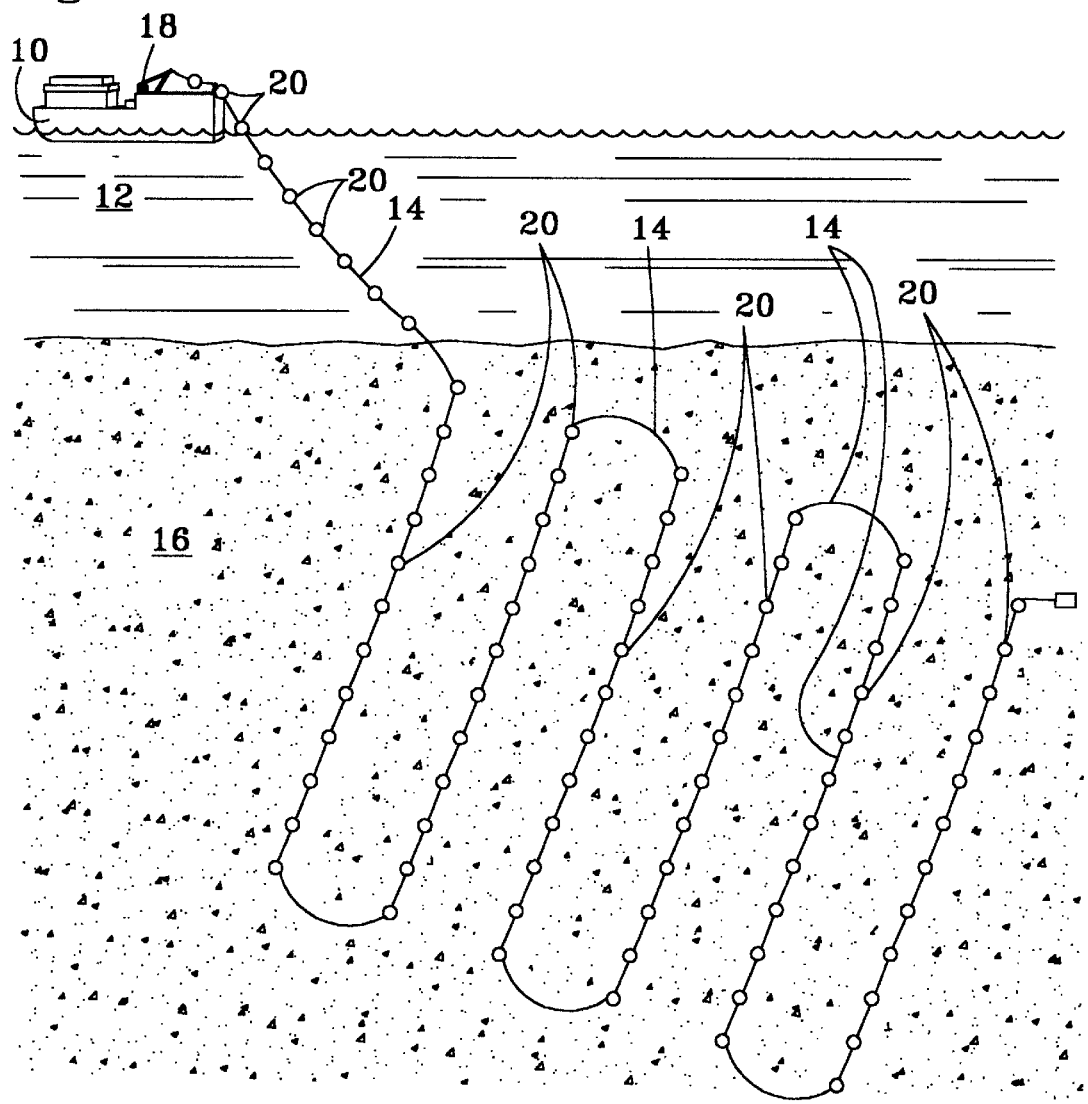
FIG. 5 illustrates a selected recorder deployment pattern.

The deployment of recorders 20 is preferably controlled by movement of vessel 10 within water 12 in a substantially horizontal plane relative to the survey area. Alternatively, two or more vessels or crafts can deploy, retrieve, process or position wire 14 and recorders 20. As wire 14 is paid out into water 12, and as vessel 10 or separate craft moves relative to water 12, each recorder 20 is lowered in water 12 until recorder 20 is proximate to seafloor 16. The descent rate and recorder 20 placement can controlled with wire 14 and can be assisted with selectively controlled floats or buoyancy chambers attached to wire 14. In a preferred embodiment of the invention, each recorder 20 contacts or is substantially proximate to seafloor 16 and is relatively stationary relative to seafloor 16 as shown in FIG. 4. The density and shape of recorders 20 can be selected so that recorders 20 contact seafloor 16 in a predictable and effectively coupled manner to maintain the fidelity of recorded seismic data. In other embodiments of the invention, recorder can supported above seafloor 16 with a frame, support, flexible pad, inflatable bag, or other device. Although different positions of recorder 20 relative to seafloor 16 are possible, the preferred embodiment places recorder 20 directly in contact with seafloor 16 so that reflected signals are transmitted directly from seafloor 16 and do not cross the boundary layer between water 12 and seafloor 16.

As each recorder 20 reaches the desired location, gimbals can orient internal components such as a data recorder, compass, and other conventional equipment. Such orientation can be locked with locking existing gimbal locks. Gimbals are not necessary to the invention but are useful if seafloor 16 has a significant slope or unstable composition. Operation of recorder 20 can be initiated before deployment to perform continuous recording, or it can be initiated with a preset clock or with another type of trigger or control signal (acoustic, optical, low frequency radio, or another method) transmitted through water 12 or through signals transmitted through wire 14. If internal clock mechanisms are used within recorders 20, such clock mechanisms can be synchronized to a calibrated clock such as a GPS clock, rubidium clock, cesium clock, or other clock prior to deployment of recorders into water 12. Although wire 14 provides the functions of positioning and retrieving multiple recorders, wire 14 can also provide telemetry, signal, and power transmission capabilities.

Cable engine 18 can retain one end of wire 16 during operation of recorders 20, or the entire length of wire 14 can be paid out from cable engine 18 as shown in FIG. 4 so that vessel 10 is unencumbered to release another wire 14 in an array. The location of wire 14 and recorders 20 can be mapped by acoustic positioning, by first-break positioning with a seismic source, by computer cable lay monitoring and control modeling software, or a combination of these techniques.

After all recorders 20 are positioned, a seismic event can be promulgated and recorded with sensors integrated with recorders 20. Different techniques can be implemented to conserve battery power. In one embodiment of the invention, an acoustic, optical, or low radio frequency trigger or other method can be sent to each recorder 20 to initiate a recording cycle. The duration of the recording cycle can be programmed so that that a "stop" signal is not required. An initiation command can also be sent which identifies the initiation time and data to be collected, and which also includes the time for cessation of data recordation. Each recorder 20 preferably records continuously and time stamps the recorded data with sufficient accuracy to correlate collected seismic data to the relevant source time. Patterns of acoustic energy source points can be planned on the surface of water 12 with standard seismic acquisition techniques.

After seismic shooting is completed for the selected area, wire 14 and recorders 20 are retrieved to the surface with cable engine 18 or similar device. Referring to FIG. 4, pop-up float 44 can be engaged with anchor 22 or with a section of wire 14 to selectively raise wire 14 and attached recorders 20 and anchors 22 to the water 12 surface for. A pop-up float such as float 44 can contain a tag line 46 capable of reaching from seafloor 16 to the surface of water 12, or can include sufficient floatation capability to raise one end of wire 14.

As wire 14 is retrieved, recorders 20 can be removed from engagement with wire 14. Such removal can be accomplished manually or with automated equipment. Each recorder 20 is connected to a data extraction station, and the seismic data detected can be extracted for recording and data processing. The data can be written to magnetic storage media in a common receiver, shot sequential method, or processed with other conventional data processing techniques.

The invention uniquely provides a reliable, inexpensive technique for deploying and retrieving seismic data recorders in water. The invention is particularly suitable for deep water because of the deployment flexibility and the absence of seals and other operating components in the deployment and retrieval system. The ease of recorder installation and removal facilitates vessel crew work and provides the opportunity to automate such work functions. Because the system does not depend on cable operation, failure of a single recorder does not jeopardize data collection operations for the other deployed recorders.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A method for collecting seismic data in water, comprising the steps of:

deploying a wire free end into the water;

engaging a plurality of recorders with said wire at selected locations along said wire;

attaching said recorders to said wire;

lowering said wire and engaged recorders into the water until said recorders are positioned at selected positions relative to the seafloor underlying the water, wherein the interval between adjacent recorders is established by the engagement with said wire;

operating said recorders to detect seismic source energy reflections and to record seismic data representing such reflections; and raising said wire to retrieve said recorders to the water surface.

2. A method as recited in claim 1, wherein said recorders are engaged with said wire to permit relative movement therebetween within a selected movement range.

3. A method as recited in claim 1, further comprising the step of lowering said recorders and wire until said recorders are coupled to the seafloor.

4. A method as recited in claim 1, wherein said recorders are engaged with connectors attached to said wire.

5. A method as recited in claim 1, further comprising the step of extracting the seismic data from said recorders.

6. A method as recited in claim 1, further comprising the step of removing said recorders from engagement with said wire.

7. A method as recited in claim 1, further comprising the step of identifying the location of each recorder before said recorders are operated to record seismic data.

8. A method as recited in claim 1, further comprising the step of identifying the orientation of each recorder before said recorders are operated to record seismic data.

9. A method as recited in claim 1, further comprising the step of transmitting a control signal to said recorders to coordinate activation of said recorders.

10. A method as recited in claim 9, wherein said control signal is transmitted through said wire.

11. A marine seismic method for detecting seismic source energy reflected from subsurface geologic formations, comprising the steps of:

storing a wire and a plurality of recorders on a vessel moveable in water;

moving the vessel to a selected location;

deploying a wire free end into the water;

attaching a plurality of recorders to said wire at selected locations along said wire;

lowering said wire and engaged recorders into the water, as said vessel is moved in the water, until said recorders are positioned at selected positions relative to the seafloor underlying the water; wherein the interval between adjacent recorders is established by the attachment with said wire;

positioning said recorders relative to the seafloor by operating a craft separate from said vessel to deploy said wire and attached recorders;

operating said recorders to detect seismic source energy reflections and to record seismic data representing such reflections;

raising said wire to retrieve said recorders to the water surface; and detaching said recorders from said wire.

12. A marine seismic method for detecting seismic source energy reflected from subsurface geologic formations, comprising the steps of:

storing a wire and a plurality of recorders on a vessel moveable in water;

moving the vessel to a selected location;

deploying a wire free end into the water;

attaching a plurality of recorders to said wire at selected locations along said wire, wherein said recorders are attached to said wire with detachable connectors;

lowering said wire and engaged recorders into the water, as said vessel is moved in the water, until said recorders are positioned at selected positions relative to the seafloor underlying the water; wherein the interval between adjacent recorders is established by the attachment with said wire;

operating said recorders to detect seismic source energy reflections and to record seismic data representing such reflections;

raising said wire to retrieve said recorders to the water surface; and detaching said recorders from said wire.

13. A method as recited in claim 12, further comprising the step of selecting the spacing between adjacent recorders along said wire.

14. A method as recited in claim 12, further comprising the step of selecting the recorder shape based on the seafloor composition.

15. A method as recited in claim 12, further comprising the step of setting timers within said recorders, as each recorder is attached to said wire, to control operation of each recorder within a selected time period.

16. A method as recited in claim 12, further comprising the step of coupling each recorder to the seafloor.

17. A method as recited in claim 12, wherein each recorder includes a pressure housing and a sensor extending exterior of said pressure housing, and further comprising the step of coupling each sensor to the seafloor.

18. A method as recited in claim 12, further comprising the step of generating a map identifying the location of each recorder relative to the seafloor.

* * * * *